United States Patent [19]
Rieper et al.

[11] Patent Number: 4,720,541
[45] Date of Patent: Jan. 19, 1988

[54] PROCESS FOR IMPROVING THE APPLICATION PROPERTIES OF DISAZO PIGMENTS

[75] Inventors: Wolfgang Rieper, Frankfurt am Main; Klaüs Hunger, Kelkheim, both of Fed. Rep. of Germany

[73] Assignee: Hoechst Aktiengesellschaft, Frankfurt am Main, Fed. Rep. of Germany

[21] Appl. No.: 627,497

[22] Filed: Jul. 6, 1984

Related U.S. Application Data

[63] Continuation of Ser. No. 398,896, Jul. 16, 1982, abandoned.

[30] Foreign Application Priority Data

Jul. 20, 1981 [DE] Fed. Rep. of Germany ....... 3128598
Apr. 1, 1982 [DE] Fed. Rep. of Germany ....... 3212105

[51] Int. Cl.$^4$ .................... C09B 35/035; D06P 1/44; C09D 7/12
[52] U.S. Cl. .................... 534/576; 106/30; 106/288 Q; 106/308 Q; 106/308 S; 106/309; 534/747; 534/887
[58] Field of Search .................. 260/208, 176; 106/30, 106/288 Q, 308 S, 309, 308 Q; 534/887, 747, 576

[56] References Cited

U.S. PATENT DOCUMENTS

| | | | |
|---|---|---|---|
| 3,169,955 | 2/1965 | Siebert et al. | 260/176 |
| 3,446,640 | 5/1969 | Orlova et al. | 106/288 Q |
| 3,891,451 | 6/1975 | Okazaui et al. | 106/30 |
| 3,974,136 | 8/1976 | Hunger et al. | 260/176 |
| 3,991,044 | 11/1976 | Conley | 260/176 |
| 3,998,645 | 12/1976 | Okamaki et al. | 106/30 |
| 4,124,582 | 11/1978 | Ribka et al. | 260/208 |

*Primary Examiner*—Floyd D. Higel
*Attorney, Agent, or Firm*—Curtis, Morris & Safford

[57] ABSTRACT

Process for improving the application properties of disazo pigments obtained by coupling bis-diazotized chlorine-substituted 4,4'-diaminobiphenyls with acetoacetylaminobenzenes, which includes adding sulfite ions to the pigment suspension obtained in the coupling and then heating for one half to two hours at 50° to 100° C. The process produces, above all in large scale industrial batches, a product of uniform quality and having acceptable fastness to solvents, overlacquering, migration and bleeding.

8 Claims, No Drawings

PROCESS FOR IMPROVING THE APPLICATION PROPERTIES OF DISAZO PIGMENTS

This application is a continuation of application Ser. No. 398,896, filed July 16, 1982, now abandoned.

Owing to its good application properties, the disazo pigment C.I. Pigment Yellow 83 (C.I. 21,108) has become established in the paints and plastics industry as one of the most important organic yellow pigments.

However, large scale industrial production frequently results in a product which, in its migration behavior, is so much worse than the chemically pure disazo compound that it no longer satisfies the high application requirements in the paints and plastics field. Frequently markedly poorer solvent, overlacquering and migration fastness properties, compared to the chemically pure disazo compounds, also occur, above all in large scale industrial preparation processes, in the case of other disazo pigments obtained by coupling bis-diazotized 4,4'-diaminodiphenyl derivatives onto acetoacetylaminobenzenes. In these industrial processes, the otherwise generally customary coupling methods are also used. Thus, a small excess of coupling component is generally used to ensure quantitative conversion of the bis-diazonium compound. Herein the coupling component is dissolved in aqueous alkalis to obtain a finely divided form capable of coupling and then reprecipitated with acid. To improve the filterability and to obtain a pigment form of soft grain and high tinctorial strength, the coupling is followed by a heating of the pigment suspension. These variations in quality are also frequently observed when the bis-diazonium salt solution and the alkaline solution of the coupling component are allowed to flow simultaneously into the reaction vessel, which may already contain a buffer solution.

A simple process has now been found which makes it possible to obtain Pigment Yellow 83 and related disazo pigments even in large scale industrial production in a degree of purity which is such that they always have acceptable solvent and migration fastness properties, in particular a high fastness to overlacquering and bleeding.

The invention thus relates to a process for improving the application properties of disazo pigments, which comprises adding sulfite ions to the weakly acid to neutral aqueous pigment suspension obtained in the coupling and then heating.

A process has been found for improving the application properties of disazo pigments, which process comprises adding sulfite ions to the weakly acid to neutral aqueous suspension obtained in the coupling of a disazo pigment having a structure which corresponds to the general formula

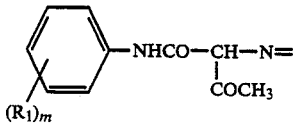

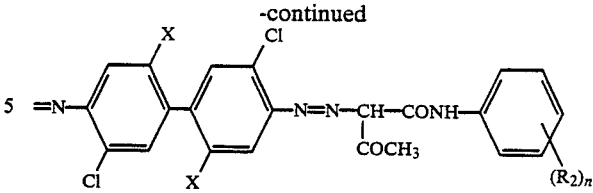

in which $R_1$ and $R_2$ denote identical or different substituents from the group comprising methyl, methoxy, ethoxy and chlorine, X denotes a hydrogen or chlorine atom and m and n independently of each other denote 0 or an integer from 1 to 3 and then heating.

The number of the substituents $R_1$ and $R_2$ varies in each case between 0 and 3.

Preferably $R_1$ and $R_2$ denote methyl, methoxy or chlorine in the 2-, 4- or 5-position and X denotes a hydrogen atom. In particular $R_1$ and $R_2$ each denote 2 methoxy groups in the 2- and 5-position and a chlorine atom in the 4-position and X denotes a hydrogen atom (Pigment Yellow 83).

The sulfite ions are added as sulfur dioxide, as a gas or in aqueous solution, or as a soluble sulfite, hydrogensulfite and disulfite, in particular as the sulfite, hydrogensulfite or disulfite of sodium or potassium in a dry or dissolved form. The amount necessary can be determined by preliminary tests and is about 0.5 to 10, preferably 2 to 5, % by weight, relative to the pigment formed.

The pigment suspension can be heated in a customary manner, for example for a few minutes up to a few hours at temperatures of about 50° to 100° C., preferably for about a half to two hours at 80° to 100° C. This heating can also be carried out in conjunction with a thermal aftertreatment at temperatures above 100° C., during which auxiliaries, such as organic solvents, may be present. However, in this case it is advantageous to increase the temperature at the start only slowly.

If it is intended to carry out a thermal aftertreatment corresponding to U.S. Pat. No. 3,974,136 first the treatment according to the invention is carried out followed by the stirring and re-precipitating in alkali, whereupon the pigment, isolated and washed until neutral, is heated in a mixture of water and an organic solvent which is not or only partially miscible with water to temperatures above 100° C. This treatment with alkali is also described in U.S. Pat. No. 4,124,582.

The pigment is isolated in a customary manner from the aqueous suspension, optionally after the organic solvent has been separated off, washed until salt-free, dried and milled.

The process according to the invention produces, above all in large scale industrial batches, a product of uniform quality and having acceptable fastness to solvents, overlacquering, migration and bleeding.

In the examples which follow parts and percentage data are by weight unless otherwise indicated.

EXAMPLE 1

50.6 parts of 3,3'-dichloro-4,4'-diaminobiphenyl were stirred with 600 parts by volume of water and 250 parts by volume of 5N hydrochloric acid and the mixture was cooled down to about 0° C. by means of ice and bisdiazotized at 0° to 5° C. with 52.5 parts by volume of a 40% strength sodium nitrite solution. The clarified bisdiazonium salt solution was allowed to flow, with thorough stirring, at 20° to 25° C. into a suspension, containing acetic acid, of 87 parts of 1-acetoacetylamino-2-methoxybenzene obtained by precipitating from an alkaline solution of the acetoacetarylide, the pH of the coupling suspension being maintained at a value of 4.5 to 5.5. After the conversion of the bis-diazonium salt was complete, 5 parts of sodium sulfite were added to the suspension, which was then heated to 90°–95° C. by passing in steam, maintained at this temperature for one hour and then cooled down to 70° C., and the solids were filtered off, washed until salt-free and dried. The yellow pigment obtained had very good fastness to overlacquering and bleeding.

EXAMPLE 2

The procedure described in Example 1 was followed but, after the coupling was complete, an alkaline solution of 37.6 parts of a commercially available resin soap was added. Reprecipitation was effected by setting a pH value of 4–5. A yellow pigment was obtained which also had very good fastness to overlacquering and bleeding.

EXAMPLE 3 (COMPARATIVE EXAMPLE)

The procedure described in Example 1 was followed with the difference that the addition of sodium sulfite was omitted. The resulting pigment, in particular in a large scale industrial batch, had a markedly reduced fastness to overlacquering and bleeding.

EXAMPLE 4

25.3 parts of 3,3'-dichloro-4,4'-diaminobiphenyl were stirred with 500 parts by volume of 31% strength hydrochloric acid, and the mixture was cooled down to about 0° C. by adding ice and bis-diazotized with 26.3 parts by volume of a 40% strength sodium nitrite solution. The mixture was diluted with 400 parts by volume of water, the slight excess of nitrite ions was destroyed with sulfamic acid, and the batch was filtered using a commercially available kieselguhr as a clarification auxiliary. The bis-diazonium salt solution thus obtained was allowed to flow with thorough stirring in the course of one hour into a finely divided suspension of 1-acetoacetylamino-2,4-dimethylbenzene, which had been prepared by precipitating an alkaline solution of 43.5 parts of the coupling component in 300 parts by volume of water and 20 parts by volume of a 33% strength sodium hydroxide solution with 14 parts by volume of glacial acetic acid at 0° to 10° C. During the coupling the pH value of the suspension was maintained within the range between 5.5 and 4.5 by the dropwise addition of 6% strength sodium hydroxide solution. After the coupling was complete, 10 parts by volume of a 40% strength sodium hydrogensulfite solution were added to the pigment suspension, which was then heated to 98° C. and maintained at this temperature for 30 minutes, and the solids were filtered off after the suspension had cooled down to 70° C. The reddish yellow pigment obtained after washing, drying and milling had, even in the case of large scale industrial preparation processes, unobjectionable overlacquering fastness, for example in nitrocellulose lacquer.

EXAMPLE 5

32.2 parts of 2,2',5,5'-tetrachloro-4,4'-diaminobiphenyl were added to 80 parts by volume of 31% strength hydrochloric acid, and the resulting paste of the hydrochloride, after stirring overnight and addition of ice, was slowly bis-diazotized with stirring at 0° to 5° C. with 26.3 parts by volume of a 40% strength sodium nitrite solution. The resulting bis-diazonium salt solution was filtered after the addition of a commercially available kieselguhr as a clarification auxiliary, and the filtrate was diluted with water to 500 parts by volume. 44 parts of 1-acetoacetylamino-4-methoxybenzene were dissolved in 400 parts by volume of water and 20 parts by volume of a 33% strength sodium hydroxide solution, the solution was filtered after active charcoal had been added, and the filtrate was adjusted to 500 parts by weight by diluting with water. The two solutions obtained were allowed to run simultaneously with stirring into a sodium acetate/acetic acid buffer solution, which had been prepared from 50 parts by volume of a 33% strength sodium hydroxide solution and 40 parts by volume of glacial acetic acid and to which 10 parts by volume of a 10% strength aqueous solution of the reaction product of 1 mole of oleyl alcohol and 30 moles of ethylene oxide had been added, at such a rate that no excess of bis-diazonium salt was detectable during the reaction. After the coupling was complete, 6 parts of sodium sulfite were added to the pigment suspension, which was then heated to 98° C. and stirred for 1 hour at this temperature, and the reaction product was then isolated in a customary manner.

A bright yellow pigment was obtained which, on incorporation into plasticized PVC, had unobjectionable fastness to migration.

EXAMPLE 6 (COMPARATIVE EXAMPLE)

The procedure described in Example 5 was followed with the difference that the addition of sodium sulfite was omitted. The pigment obtained had on incorporation into plasticized PVC a considerably poorer migration fastness than the pigment of Example 5.

EXAMPLE 7

32.2 parts of 2,2',5,5'-tetrachloro-4,4'-diaminobiphenyl were bis-diazotized as described in Example 5. A finely divided suspension of the coupling component was prepared by dissolving 51 parts of 1-acetoacetylamino-2-methoxy-4-chlorobenzene in 400 parts by volume of water and 20 parts by volume of a 33% strength sodium hydroxide solution and subsequent precipitation with 14 parts by volume of 96% strength acetic acid in the presence of 20 parts by volume of a 10% strength aqueous solution of the reaction product of 1 mole of stearyl alcohol and 25 moles of ethylene oxide. The bis-diazonium salt solution was allowed to flow with stirring in the course of one hour into this suspension, the pH value of the reaction mixture being maintained at about 4 to 3.5 by the dropwise addition of 4N sodium acetate solution. Immediately after the coupling was complete, 7 parts of potassium disulfite were added to the suspension of the disazo pigment, and the mixture was heated to 95° C. by passing in steam and stirred for 1 hour at this temperature. After the mixture had been filtered, a greenish-yellow pigment was obtained which was washed until salt-free, dried at 60° C. and finally milled. The pale yellow pigment, on incorporation into plasticized PVC, had good fastness to migration.

EXAMPLE 8 (COMPARATIVE EXAMPLE)

The procedure described in Example 7 was followed with the difference that the addition of potassium disulfite was omitted. The pigment obtained had on incorporation into plasticized PVC poor fastness to migration.

EXAMPLE 9

50.6 parts of 3,3'-dichloro-4,4'-diaminobiphenyl were bis-diazotized by the method described in Example 1. 43.5 parts of 1-acetoacetylamino-2-methoxybenzene and 43.5 parts of 1-acetoacetylamino-2,4-dimethylbenzene were dissolved in 800 parts by volume of water by adding 40 parts by volume of a 33% strength sodium hydroxide solution, the alkaline solution was clarified with the use of active charcoal, and the mixture of the coupling components was precipitated after the addition of 5 parts by volume of a 10% aqueous solution of the reaction product of 1 mole of stearyl alcohol and 20 moles of ethylene oxide with stirring by means of 28 parts by volume of 96% strength acetic acid. After the addition of 100 parts of crystalline sodium acetate, the solution of the bis-diazonium salt was allowed to flow into the suspension obtained. Immediately after the coupling was complete, 8 parts of potassium sulfite were added, and the pigment suspension was heated for 1 hour at 95° C. by passing in steam. After the mixture had cooled down to 60° C., the mixed coupling product was filtered off with suction, washed with warm water until salt-free, dried and milled. The resulting yellow pigment had unobjectionable solvent fastness.

EXAMPLE 10 (COMPARATIVE EXAMPLE)

The procedure described in Example 9 was followed with the difference that the addition of potassium sulfite was omitted. The pigment obtained had a poorer solvent fastness than the pigment of Example 9.

EXAMPLE 11

50.6 parts of 3,3'-dichloro-4,4'-diaminobiphenyl were stirred with 600 parts by volume of water and 250 parts by volume of 5N hydrochloric acid, and the mixture was cooled down to 0° C. by means of ice and was bis-diazotized at 0° to 5° C. with 52.5 parts by volume of a 40% strength sodium nitrite solution. The clarified bis-diazonium salt solution was allowed to flow with thorough stirring at 20° to 25° C. into a suspension, containing acetic acid, of 115 parts of 1-acetoacetylamino-4-chloro-2,5-dimethoxybenzene obtained by precipitating the acetoacetarylide from an alkaline solution, the pH of the coupling suspension being maintained at a value of 4.5 to 5.5. After the conversion of the bis-diazonium salt was complete, 5 parts of sodium sulfite were added to the suspension, which was then heated to 90°-95° C. by passing in steam, maintained for one hour at this temperature and then cooled down to 70° C., and the solids were filtered off, washed until salt-free and dried. The pigment obtained has completely unobjectionable fastness to overlacquering and bleeding.

The coupling can also be carried out in the presence of resin soap. Without the addition of an alkali metal sulfite, hydrogensulfite or pyrosulfite or of sulfur dioxide but in an otherwise identical procedure, in particular in large scale industrial batches, the pigment obtained has markedly reduced fastness to overlacquering and bleeding.

EXAMPLE 12

In a modification of the process according to Example 11, solutions of the bis-diazonium salt and of the coupling component, prepared as in Example 11, were allowed to flow simultaneously into a reaction vessel into which acetic acid and a surface-active agent had already been initially introduced.

After the coupling was complete, 5%, relative to the pigment yield, of potassium hydrogensulfite was added to the crude pigment suspension, which was then heated by jacket heating to 85°-90° C. and maintained at this temperature for two hours. The batch was then worked up as described in Example 11. The pigment obtained had completely unobjectionable overlacquering and migration fastness.

EXAMPLE 13

The procedure of Example 11 was followed, but after the cooling down to 70° C. the suspension was rendered alkaline with sodium hydroxide solution, and Example 1 of German Auslegeschrift No. 2,302,509 was followed from then on. The pigment thus obtained in the form described there had great hiding power, good viscosity and high gloss. Furthermore, a uniform quality having unobjectionable fastness to overlacquering and bleeding is obtained even in large scale industrial batches.

We claim:

1. A process for improving the application properties of disazo pigments, which comprises adding sulfite ions to the weakly acid to neutral aqueous pigment suspension obtained in the coupling of a disazo pigment having a structure which corresponds to the formula

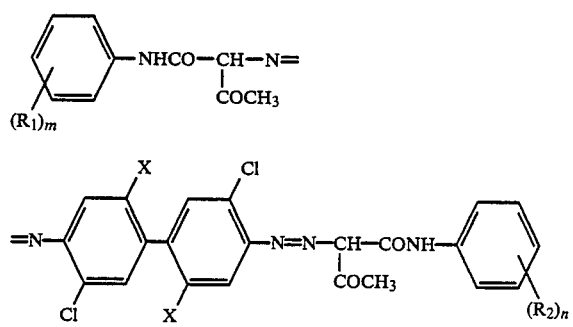

in which $R_1$ and $R_2$ denote identical or different substituents from the group comprising methyl, methoxy, ethoxy and chlorine, X denotes a hydrogen or chlorine atom and m and n independently of each other denote 0 or an integer from 1 to 3 and then heating the pigment suspension for a half to two hours at 50° to 100° C.

2. The process as claimed in claim 1, wherein, in the formula, $R_1$ and $R_2$ denote methyl, methoxy or chlorine in the 2-, 4- or 5-position and X denotes a hydrogen atom.

3. The process as claimed in claim 1, wherein the disazo pigment is C.I. Pigment Yellow 83.

4. The process as claimed in claim 1, wherein the sulfite ions are added in the form of sulfur dioxide or as a soluble sulfite, hydrogensulfite or disulfite.

5. The process as claimed in claim 2, wherein the disazo pigment is C.I. Pigment Yellow 83.

6. The process as claimed in claim 2, wherein the sulfite ions are added in the form of sulfur dioxide or as a soluble sulfite, hydrogensulfite or disulfite.

7. The process as claimed in claim 3, wherein the sulfite ions are added in the form of sulfur dioxide or as a soluble sulfite, hydrogensulfite or disulfite.

8. The process as claimed in claim 5, wherein the sulfite ions are added in the form of sulfur dioxide or as a soluble sulfite, hydrogensulfite or disulfite.

* * * * *